3,125,450
PROCESSES FOR RECONSTITUTING MEAT
Beverly E. Williams, La Grange Park, Ill., assignor, by mesne assignments, to Chas. Pfizer & Co., Inc., New York, N.Y., a corporation of Delaware
No Drawing. Filed Jan. 10, 1962, Ser. No. 165,297
5 Claims. (Cl. 99—107)

The present invention relates to processes for reconstituting meat and more particularly to such processes which are used to treat freshly slaughtered edible carcasses of meat animals to reduce loss of moisture and of volatile flavors when the carcasses are refrigerated.

Before the days of mechanical refrigeration when ice was used to chill freshly slaughtered edible carcasses of beef, lamb, veal, pork and the like the carcasses did not shrink appreciably or measurably from hot to cold weight. The ice houses in which the meat was refrigerated maintained a nearly 100% relative humidity due to the moisture. Those with long experience in the meat industry, especially in the hotel and restaurant business, insist that this ice-chilled beef was superior in flavor and juiciness to the beef of today regardless of the advances we have made in breeding, feeding, slaughtering, refrigeration and shipment and storage of fresh meat.

With modern mechanical refrigeration the highest relative humidity that can be obtained in beef coolers, refrigerated cars and trucks is 90% and the usual relative humidity is 80%, often lower. Freshly slaughtered edible carcasses hung in modern coolers will lose from 1 to 3% in moisture evaporation not only during overnight chilling but also during periods when they are held under refrigeration in coolers before shipment to the ultimate consumer. The moisture evaporated from the carcass contains valuable flavor juices. Meat flavors and aromas are volatile and escape from the meat with evaporation of moisture from the carcass. Lack of flavor in meat, especially beef and veal, is everywhere apparent. Condiments are relied upon to restore lost flavor, but rather than restoring the flavor that is lost to the refrigeration coils of the cooler, they only impart flavors of their own. In the industry's quest for tenderness in meats, flavor has been overlooked. Instead, open fire and charcoal broiling are relied upon to substitute a charred flavor for real for real meat flavor and aroma. But no meats, or cuts of meat, can be broiled or surface charred.

Many attempts have been made to raise the humidity of chilling and holding coolers. These range from live steam jets to fog and turbo-chill machines. Each of these methods has its particular drawback. Live steam works against refrigeration and the fog machines deposit too much free moisture on the carcasses. Units for turbo-chilling are expensive both to install, to maintain and to operate.

Other methods have been experimented with to reduce evaporation from the surface of the carcass such as clothing the carcass in rubber or semi-airtight plastic coatings but all of these trapping result in an objectionably moist and soft surface fat for the beef, lamb or other carcasses.

I have now found that if a moisture barrier is imposed just under the layer of outside fat on the animal carcass a barrier to the evaporation of juices is established and this film of moisture will itself evaporate before moisture is drawn from the interior of the carcass. Cooked meat from carcasses treated in this manner has been found to have more natural juiciness and flavor and the carcasses, after cooling, have lost only the weight of the added moisture-barrier film of water. The water preferably is stitch-pumped at a low pressure before the animal is skinned, or prior to complete removal of the natural hide or skin between the fat layer and under the fell or membrane of the adjacent meat at temperatures well under natural animal body temperature and preferably at approximately 40° F. to 60° F. to help chill and congeal the adjacent fat. The cold water barrier should be created while the carcass is still hide-on, is warm and flaccid and before rigor mortis to help congeal the fat and protect the moisture barrier.

It is therefore the object of the present invention to prevent flavor loss and moisture vapor loss from freshly slaughtered carcasses of edible animals by stitch-pumping into the major portion of edible animal carcasses, while warm and flaccid and before the completion of rigor mortis, a moisture-barrier film of cold water under the natural hide before complete removal thereof and between the outside layer of fat and the underlying lean meat, thereby helping to cool and congeal the outside fat, fell or membrane covered surface of the carcass. With calves dressed for hide-on chilling it is quite practical to insert the water barrier between hide and surface meat. By the time the calves are thoroughly chilled and ready for cold skinning the water will have completely evaporated or have been absorbed by the adjacent meat. If the calf is skinned before the evaporation or absorption of all of the moisture, the surplus is removed by the normal washing, wiping or clothing operation. The same applies to beef, lamb and pork. Because beef and lamb are skinned on the killing floor, the water insertion must be deeper than just between hide and surface or else all the added moisture would be lost when the carcass is skinned generally within minutes after slaughter.

In accordance with the present concept, mate sides of "U.S. Choice" grade skinned beef weighing approximately 300 pounds each were obtained and one side was stitch-pumped by multiple entry injection while still warm and flaccid and before rigor mortis with three pints of cold water at approximately 50° F. at low pressure of under 40 pounds per square inch and preferably at pressures ranging from 15 to 35 pounds per square inch with the needles inserted adjacent the base of the layer of outside fat. The sides were then conventionally shrouded in heavy ramie cloth and hung in the same cooler. The following morning the ramie shroud cloths were removed from both sides. At the end of three days the control side had shrunk 1.75% and the side processed in accordance with the present invention had not lost weight from its original hot weight indicating that the weight loss was almost entirely the weight of the added moisture.

Subsequently the control side of beef was again weighed and had shrunk approximately 2% in 7 days from kill while the treated side had shrunk approximately 1% during the same period indicating that after the evaporation of the added moisture there did occur weight loss from the meat itself but only 50% as much weight or moisture loss as the control.

The control and treated sides were then divided into commercial and retail cuts; were cooked; and were subjected to organoleptic tests. Cuts of meat processed in accordance with the present invention exhibited a noticeable improvement in flavor but there was only slight improvement in tenderness. The treated cuts of meat were more juicy and had a richer almost aged flavor. The cooked meat was scored on a 1 to 10 basis, with the higher number representing preferred rating. The control rated in the 5–6–7 range and the treated in the 8–9–10 range.

In these tests a pump developing up to 35 pounds pressure per square inch was employed and the cold water was forced into the area between the surface layer of fat and the meat at pressures ranging from approximately 15 to 35 pounds per square inch. Higher pressures should be avoided because it is undesirable to unduly separate the fat from the adjacent lean meat. However, when conducting the tests with carcasses before they are skinned somewhat higher pressures can be employed because of the protective hide coat or covering.

In conducting these tests the water was injected underneath the fat and between the fat and the meat rather than penetrated into the meat to separate the muscle bundle fibers. The normal clothing or shrouding operation smoothes out air or water bubbles in the fat and minor surface fat distortions or disruptions are visibly eliminated. A hydrated barrier was formed under the surface of the meat to prevent evaporation of the natural meat juices and consequent loss of the volatile flavors. Human taste is related to smell and trapping of volatile meat flavors by reduced evaporative shrinkage of the meat therefore results in improved flavor in the cooked meat.

In accordance with the present concept, a round dressed, hide-on calf weighing 150 pounds was injected under the hide, with the point of needles penetrating the surface meat at times, with 3% or 1½ pints of cold tap water. Pressures in excess of 35 pounds per square inch and up to 50 pounds p.s.i. were used because of the protective covering of the hide. The pressure of the fluid, with hide-on treatment, when the needles are inserted between hide and meat, can be much greater than when inserted directly into the surface meat. Also, when the carcass is injected hide-on, the pressures can be greater than with skinned carcasses. Likewise, with tightly shrouded carcasses, as when strong ramie shrouds are used, the pressures can be greater than with bare sides and carcasses but not as great as with hide-on carcasses.

A mate calf of approximately the same age, size and weight was round dressed, hide-on for control comparison. The control calf shrank 2% over night. The treated calf weighed 1% more than on the killing floor. Both hide-on calves were thoroughly wiped to dry the hair of the hide and thus remove the variable of wash water weight on the hides. On the third day from kill the control calf had lost approximately 3% while the treated calf now weighed approximately the same as on the killing floor. The two calves were skinned and compared for appearance. The treated calf was somewhat lighter in red meat color, the fat was whiter but more moist and softer. Both calves were wrapped in heavy stretch-paper kraft bags and held four more days in the same cooler. There was no apparent difference in appearance. Shrink figures, hot hide-on to bare skinned, were meaningless because of the difference in the weights of the two calfskins.

Eating tests on loin chops from each calf exhibited a pronounced preference for the treated calf especially because of the increased juiciness of the broiled meat and also its improved flavor. Veal is rather dry, juiceless meat and increasing its juiciness is helpful. On a scale of 1 to 10, with 10 being the best, the control averaged 5½ and the treated 9½, when organoleptically judged for flavor and juiciness. No tenderness ratings were recorded.

Again, in accordance with the concept of this invention a choice steer weighing approximately 600 pounds in the beef was selected immediately after the slaughtering, dressing and shrouding operations. The right or tight-kidney side was sent to the cooler and tagged control. The left side was injected with 6 pints, 2%, of cold, tap water by multiple injection through the tightly skewered ramie shroud into the fat, fell and surface tissue. The needles were inserted while being held and positioned nearly flat against the surface of the carcass so that penetration would be superficial only and not penetrate into and separate the muscle bundle fibers. Unlike hide-on treatment, where the needles must be inserted at the cut edges of the hide so as not to puncture and down grade the hide, clothed or shrouded sides of beef and heavy veal or carcasses of lamb and round-dressed veal may be injected through the shroud cloth at appropriate and easily accessible points or areas.

Shrinkage and eating tests greatly favored the treated side over the control.

The layer of water injected underneath the fat evaporates during the period that the carcasses are maintained in the cooler. This occurred in the example given above in view of the reduced loss of weight from the hot weight of the treated side as compared to the control side. The fact that the injected water formed a moist barrier preventing evaporation of natural meat juices and volatile flavors is evidenced and proved by the improved flavor and juiciness score of the cooked commercial cuts of meat from the treated side as discussed above.

I have further found that the addition of a small amount of citric acid to the cold water to be injected still further improves the flavor of the meat by providing an "aged" flavor. The tart or tang of citric acid, not in itself desirable as a meat condiment, proves very desirable in enhancing the flavor characteristics of long aged beef, lamb and mutton. The amount of citric acid required is not large and is preferably approximately 1 ounce for each pint of cold water used or about 3 ounces to a 300 pound side of beef.

I have further found that the addition of a broad spectrum antibiotic, such as oxytetracycline, to the water to be injected, in the proportion of one part OTC to 3 parts citric acid has a condition improvement effect upon the meat, preventing surface spoilage and the development of off-odors and off-flavors during the storage and marketing periods.

It is apparent that the amount of water utilized to form the hydrated barrier under the surface of the meat adjacent the fat layer to inhibit and slow down evaporation of the natural meat juices and volatile flavors chilled or cooled storage of commercial carcasses, sides, quarters, etc. can be varied somewhat depending upon the species and weight of animal, whether the injection is made before or after "hot skinning" and whether the carcass, veal for example, is to be chilled with skin or hide on and whether lambs, for example, are to be chilled, shrouded or bare. All commercial beef sides are chilled shrouded. The amount of added moisture should be commensurate with the normal moisture loss or shrinkage of the carcass and the cooling and storage or shipping conditions to which it will be exposed. Higher relative humidities during cooling require less added moisture than lower relative humidities in the cooler. I have found that the amount of water to be added to form the hydrated barrier can range from approximately 1% to approximately 3% of the hot weight of the carcass to be treated.

It should now be apparent that the present invention in every way satisfies the objective discussed above.

Changes in or modifications to the above described illustrative embodiment of this invention may now be suggested to those skilled in the art without departing from the present inventive concept. Reference should therefore be had to the appended claims to determine the scope of this invention.

What is claimed is:

1. In a process for reconstituting meat and improving its cooked flavor the steps of stitch-pumping the major portions of an edible animal carcass after slaughter and before the completion of rigor mortis by multiple entry injection of water at approximately 50° F. between the outer layer of fat and fell and the adjacent lean meat at pressures of from 15 to 50 pounds per square inch with the injected water weighing approximately 1 to 3% by weight of the dressed weight of the meat whereby a hydrated barrier is established around the surface of the lean meat reducing evaporation of the natural meat juices and loss of volatile flavors and enhancing the flavor and juciness of the meat after cooking.

2. A process as described in claim 1 in which the step of multiple entry injection is performed prior to complete removal of the natural hide and at pressures of from 35 to 50 pounds per square inch.

3. A process as described in claim 1 in which a surface shroud is applied to the carcass prior to the step of multiple entry injection.

4. A process as described in claim 1, the injected water including approximately 1 ounce of citric acid for every 100 pounds of meat to be treated.

5. A process as described in claim 1, the injected water including a broad spectrum antibiotic and citric acid in the approximate proportion of one part antibiotic to 3 parts citric acid.

References Cited in the file of this patent
UNITED STATES PATENTS

| | | |
|---|---|---|
| 2,805,163 | Williams et al. | Sept. 3, 1957 |
| 2,824,011 | Williams | Feb. 18, 1958 |
| 2,852,391 | Williams | Sept. 16, 1958 |
| 2,961,321 | Williams | Nov. 22, 1960 |
| 3,006,768 | Williams | Oct. 31, 1961 |

UNITED STATES PATENT OFFICE
CERTIFICATE OF CORRECTION

Patent No. 3,125,450            March 17, 1964

Beverly E. Williams

It is hereby certified that error appears in the above numbered patent requiring correction and that the said Letters Patent should read as corrected below.

Column 1, lines 19 and 20, after "moisture" insert -- from the melting ice and evaporation of this moisture --.

Signed and sealed this 7th day of July 1964.

(SEAL)
Attest:

ERNEST W. SWIDER
Attesting Officer

EDWARD J. BRENNER
Commissioner of Patents